US010908569B2

(12) United States Patent
DiGiorgio et al.

(10) Patent No.: US 10,908,569 B2
(45) Date of Patent: *Feb. 2, 2021

(54) METHODS FOR OPTIMIZING IDENTIFICATION, CROSS-CORRELATION, BUILDING, AND UTILIZATION OF MEDIA CONTENT OF MOTORIZED TRANSPORT INVENTORY AND DEVICES THEREOF

(71) Applicant: Tru Images, Inc., Penfield, NY (US)

(72) Inventors: Frank DiGiorgio, Webster, NY (US); Mark Agor, Webster, NY (US); Dennis Wheeler, Rochester, NY (US)

(73) Assignee: TRU IMAGES, INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,297

(22) Filed: May 24, 2019

(65) Prior Publication Data

US 2019/0278241 A1    Sep. 12, 2019

Related U.S. Application Data

(63) Continuation of application No. 14/617,095, filed on Feb. 9, 2015, now Pat. No. 10,324,427.

(60) Provisional application No. 61/936,927, filed on Feb. 7, 2014.

(51) Int. Cl.
*G05B 15/02* (2006.01)
*G06F 16/54* (2019.01)
*G06F 16/58* (2019.01)

(52) U.S. Cl.
CPC ............ *G05B 15/02* (2013.01); *G06F 16/54* (2019.01); *G06F 16/58* (2019.01)

(58) Field of Classification Search
USPC ....................................................... 705/228
See application file for complete search history.

(56) References Cited

U.S. PATENT DOCUMENTS

2007/0046771 A1* 3/2007 Luellau ............. G06K 15/1252
347/239
2016/0300316 A1* 10/2016 Beseda ................... G06F 16/54

* cited by examiner

*Primary Examiner* — Garcia Ade
(74) *Attorney, Agent, or Firm* — Troutman Pepper Hamilton Sanders LLP (Rochester)

(57) ABSTRACT

This technology includes identifying current items of motorized transport inventory having one or more current features from received motorized transport inventory data. Each match of one or more mapped features of any mapped master pieces of media content with the current features of any of the current items of motorized transport inventory is determined. At least one of the master pieces of media content is mapped to two or more of the current items of motorized transport inventory. Any missing pieces of media content of the one or more current features of any of the current items of motorized transport inventory are identified based on the one or more determined matched master pieces of media content. One or more of the identified missing pieces of media content of any of the current items of motorized transport inventory is obtained. The one or more identified matched master pieces of media content and the one or more of the obtained missing pieces of media content is provided to a requesting sales management computing device associated with the current inventory set of items.

9 Claims, 20 Drawing Sheets

Mapping Images:

Mapping Images:

Mapping Images:

Data Processing:

When all other categories are matched, the software searches for matching options as defined by the radio buttons selected for each image:

| Car Options | | | |
|---|---|---|---|
| 2Q Always Qualifies ⦿ | Visible/Captured ○ | Visible/Not Captured ○ | BLOCKED ○ |
| 3P Always Qualifies ⦿ | Visible/Captured ○ | Visible/Not Captured ○ | BLOCKED ○ |

- Always Qualifies – When selected, the software accepts the image as a match regardless of whether or not the dealer data has it listed. This is the default radio button.

- Visible/Captured – If the dealer data shows that a specific vehicle DOES NOT have this option listed, the image is rejected. If the dealer data shows that a specific vehicle DOES have this option listed, the image is accepted.

- Visible Not Captured – If the dealer data shows that a specific vehicle DOES have this option listed, the image is rejected. If the dealer data shows that a specific vehicle DOES NOT have this option listed, the image is accepted.

- Blocked – When selected, the software rejects the image as a match regardless of whether or not the dealer data has it listed.

FIG. 9

Data Input:

When a dealer's inventory data is processed through our software, it contains vehicle information that enables our software to select the images that will be used to pictorially represent a specific vehicle, by VIN#. The information contained within the dealers inventory report (dependent upon the dealers DMS) looks something like this:

Dealer Inventory Data - CSV

| YR | MAKE | MODEL | VIN # | TRIM LEVEL | OPTIONS | OPTION DESCRIPTIONS | EXTERIOR COLOR | INTERIOR COLOR |
|---|---|---|---|---|---|---|---|---|
| 13 | TOYOTA | 4RUNNER | JTEBU5JR5D5145854 | 8664 | CF DK FE | 5-PC PREM CARP FLR MAT SET | 1F7 | FJ13 |
|  |  |  |  |  |  | PREFERRED OWNERS MANUAL |  |  |
|  |  |  |  |  |  | 50-ST EMIS |  |  |
| 13 | TOYOTA | 4RUNNER | JTEBU5JR0D5148015 | 8670 | CF EE FE | 5-PC PREM CARP FLR MAT SET | 1F7 | FA13 |
|  |  |  |  |  |  | DISP AUD W/NAV/ENTUNE |  |  |
|  |  |  |  |  |  | 50-ST EMIS |  |  |
| 13 | TOYOTA | 4RUNNER | JTEBU5JR0D5148354 | 8668 | CF C7 FE LT NV | 5-PC PREM CARP FLR MAT SET | 202 | LB23 |
|  |  |  |  |  |  | CONV PKG |  |  |
|  |  |  |  |  |  | 50-ST EMIS |  |  |
|  |  |  |  |  |  | LTD ED PKG |  |  |
|  |  |  |  |  |  | NAV SYST |  |  |
| 14 | TOYOTA | 4RUNNER | JTEBU5JR3E5154554 | 8668 | CF DK E5 FE MF WL 3P 3Z 5A |  | 218 | LA22 |
|  |  |  |  |  |  | CARP MAT SET |  |  |
|  |  |  |  |  |  | PREFERRED OWNER'S PORTFOLIO |  |  |
|  |  |  |  |  |  | EXH TIP |  |  |
|  |  |  |  |  |  | 50 ST EMIS |  |  |
|  |  |  |  |  |  | MUD GUARDS |  |  |
|  |  |  |  |  |  | ALLOY WHL LCKS |  |  |
|  |  |  |  |  |  | PNT PROT FILM |  |  |
|  |  |  |  |  |  | FIRST AID KIT |  |  |
|  |  |  |  |  |  | CARGO CVR |  |  |
| 13 | TOYOTA | AVALON | 4T1BK1EB0DU005096 | 3548 | FE CF | 50 ST EMIS | 218 | LT20 |
|  |  |  |  |  |  | CARP FLR/CARGO MAT SET |  |  |
| 13 | TOYOTA | AVALON | 4T1BK1EB8DU023992 | 3546 | FE CF | 50 ST EMIS | 218 | LF20 |
|  |  |  |  |  |  | CARP FLR/CARGO MAT SET |  |  |

FIG. 10

FIG. 11

Branding:
Branding is the process by which we add certain characteristics to ALL EXTERIOR images within each image pack that are unique to each dealership.

An example is shown below:

Strategic placement of dealer logos.

Data Output:

When a dealer's inventory data is processed through our software, it contains vehicle information that enables our software to select the images that will be used to pictorially represent a specific vehicle, by VIN#. The information that is output from our software matches a dealer's inventory (by Vin #) to a collection of mapped images. The mapped images are stored as URL files and distributed as required. The output data (dependent upon the dealer requirements) may look something like this:

Tru Images URL Output - CSV

| Vin # | Image URL |
|---|---|
| 4T1BK1EB0DU005090 | http://www.truimagesauto.com/FileArchive/13-TOY-AVA-3548-218-XX-AY-CF-DK-FE-WX/E01.jpg,http://www.truimagesauto.com/FileArchive/13-TOY-AVA-3548-218-XX-AY-CF-DK-FE-WX/E02.jpg,http://www.truimagesauto.cc |
| 4T1BK1EB6DU038376 | http://www.truimagesauto.com/FileArchive/13-TOY-AVA-3548-218-XX-AY-CF-DK-FE-WX/E01.jpg,http://www.truimagesauto.com/FileArchive/13-TOY-AVA-3548-218-XX-AY-CF-DK-FE-WX/E02.jpg,http://www.truimagesauto.cc |
| 4T1BK1EB5DU045111 | http://www.truimagesauto.com/FileArchive/13-TOY-AVA-3548-218-XX-AY-CF-DK-FE-WX/E01.jpg,http://www.truimagesauto.com/FileArchive/13-TOY-AVA-3548-218-XX-AY-CF-DK-FE-WX/E02.jpg,http://www.truimagesauto.cc |
| 4T1BK1EB0DU048739 | http://www.truimagesauto.com/FileArchive/13-TOY-AVA-3548-1F7-XX-AY-CF-DK-FE-WX/E01.jpg,http://www.truimagesauto.com/FileArchive/13-TOY-AVA-3548-1F7-XX-AY-CF-DK-FE-WX/E02.jpg,http://www.truimagesauto.cc |
| 4T1BK1EB2DU052517 | http://www.truimagesauto.com/FileArchive/13-TOY-AVA-3548-218-XX-AY-CF-DK-FE-WX/E01.jpg,http://www.truimagesauto.com/FileArchive/13-TOY-AVA-3548-218-XX-AY-CF-DK-FE-WX/E02.jpg,http://www.truimagesauto.cc |
| 4T1BK1EB4DU059016 | http://www.truimagesauto.com/FileArchive/13-TOY-AVA-3548-218-XX-AY-CF-DK-FE-WX/E01.jpg,http://www.truimagesauto.com/FileArchive/13-TOY-AVA-3548-218-XX-AY-CF-DK-FE-WX/E02.jpg,http://www.truimagesauto.cc |
| 4T1BK1EB8DU061500 | http://www.truimagesauto.com/FileArchive/13-TOY-AVA-3548-3R0-XX-AY-CF-DK-FE-WX/E01.jpg,http://www.truimagesauto.com/FileArchive/13-TOY-AVA-3548-3R0-XX-AY-CF-DK-FE-WX/E02.jpg,http://www.truimagesauto.cc |
| 4T1BK1EB0DU065556 | http://www.truimagesauto.com/FileArchive/13-TOY-AVA-3548-218-XX-AY-CF-DK-FE-WX/E01.jpg,http://www.truimagesauto.com/FileArchive/13-TOY-AVA-3548-218-XX-AY-CF-DK-FE-WX/E02.jpg,http://www.truimagesauto.cc |
| 4T1BK1EBXDU065600 | http://www.truimagesauto.com/FileArchive/13-TOY-AVA-3548-070-XX-AY-CF-DK-FE-WX/E01.jpg,http://www.truimagesauto.com/FileArchive/13-TOY-AVA-3548-070-XX-AY-CF-DK-FE-WX/E02.jpg,http://www.truimagesauto.cc |
| 4T1BK1EB3DU068810 | http://www.truimagesauto.com/FileArchive/13-TOY-AVA-3548-1F7-XX-AY-CF-DK-FE-WX/E01.jpg,http://www.truimagesauto.com/FileArchive/13-TOY-AVA-3548-1F7-XX-AY-CF-DK-FE-WX/E02.jpg,http://www.truimagesauto.cc |

FIG. 15

Admin

[Toggle Option Codes] [Dealership Options] [Blocked Cars]

[Sienna ▼] [Save Options]

- Use "Toggle Option Codes" to ignore model specific options for exteriors, interiors or both. For example: An FE (Federal Emission) code is not visible to a consumer, so the check can be removed from the box for both the interior and exterior. If a box is NOT checked, the option will be ignored

| Option Code | Exterior | Interior |
|---|---|---|
| SELECT ALL | ALL | ALL |
| SELECT NONE | NONE | NONE |
| CF | ✓ | ✓ |
| CF-0 | ✓ | ✓ |
| D5 | ✓ | ✓ |
| D5-0 | ✓ | ✓ |
| DK | ✓ | ✓ |
| EW | ✓ | ✓ |
| EX | ✓ | ✓ |

FIG. 16

| Year | Make | Model | Trim | Exterior | Options | Count | View Cars |
|---|---|---|---|---|---|---|---|
| 2015 | Toyota | Camry | 2532 | 040 | | 6 | View Cars |
| 2015 | Toyota | Sienna | 5338 | 040 | CF DK FE CF-0 | 5 | View Cars |
| 2015 | Toyota | RAV4 | 4432 | 202 | CF DK FE RR TC CF-0 | 4 | View Cars |
| 2015 | Toyota | Corolla | 1852 | 1F7 | CF FE CF-0 | 4 | View Cars |
| 2015 | Toyota | Corolla | 1852 | 040 | CF FE CF-0 DK | 4 | View Cars |
| 2015 | Toyota | Venza | 2810 | 1H2 | CF DK FE CF-0 | 4 | View Cars |
| 2014 | Toyota | Prius c | 1205 | 1G3 | AW CF DK FE CF-0 | 4 | View Cars |
| 2015 | Toyota | RAV4 | 4452 | 070 | CF DK FE CF-0 AP | 3 | View Cars |
| 2014 | Toyota | Prius c | 1201 | 1G3 | CF FE CF-0 | 3 | View Cars |
| 2015 | Toyota | Corolla | 1852 | 1F9 | CF FE CF-0 DK | 3 | View Cars |

Showing 1 to 10 of 278 entries  Previous 1 2 3 4 5 ... 28 Next

Generate Exterior CSV * Note this will use all current filters you are searching for

Car Lookup

VIN NUMBER

STOCK NUMBER  1411679

SUBMIT

Year 2014  Make TOYOTA  Model CAMRY  Trim 2532  Interior FD10  Exterior 040  Options CF DK CA MY VP

| Exterior Pictures | Interior Pictures |
|---|---|
| https://s3.amazonaws.com/DEALERSHIP_1_test_IMAGE_BUCI | https://s3.amazonaws.com/DEALERSHIP_1_test_IMAGE_BUCI |

 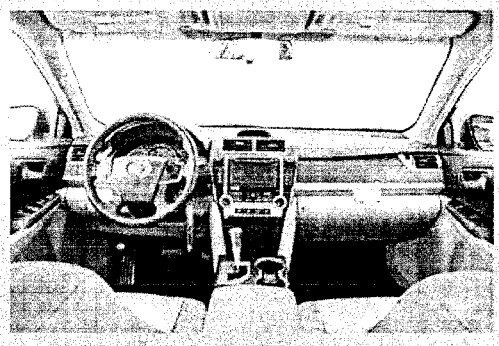

DELETE    DELETE https://s3.amazonaws.com/DEALERSHIP_1_test_IMAGE_BUCI  https://s3.amazonaws.com/DEALERSHIP_1_test_IMAGE_BUCI

 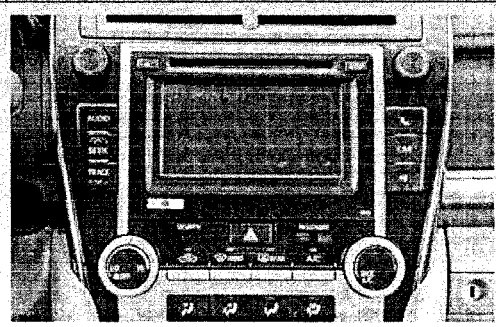

FIG. 19

METHODS FOR OPTIMIZING IDENTIFICATION, CROSS-CORRELATION, BUILDING, AND UTILIZATION OF MEDIA CONTENT OF MOTORIZED TRANSPORT INVENTORY AND DEVICES THEREOF

This application is a continuation of U.S. patent application Ser. No. 14/617,095, filed Feb. 2, 2015, which claims the benefit of U.S. Provisional Patent Application Ser. No. 61/936,927 filed Feb. 7, 2014, which is hereby incorporated by reference in its entirety.

FIELD

This technology generally relates to image management methods and devices and, more particularly, methods for optimizing identification, cross-correlation, building, and utilization of media content of motorized transport inventory and devices thereof.

BACKGROUND

When a motorized transport buyer is shopping for new motorized transports online, the current shopping experience is designed to give a consumer a general idea of what an automotive dealer's motorized transport inventory may look like. Typically, an automotive dealer's website will show a stock photo of every new motorized transport in inventory, but not of the actual motorized transports on the dealer lot. A stock photo is a licensed image sold by a third party and is used to generically represent what a motorized transport might look like. Unfortunately, the stock photos may not have the same factory options and/or colors as the actual motorized transports on the dealer's lot.

A motorized transport shopper also may elect to go to the motorized transport manufacturer's website to virtually build their motorized transport. This approach will often result in a CGI (Computer Generated Image) that fails to give the buyer a sense of "ownership" as it's only a cartoon and quite obviously not an actual photograph. Additionally, these manufacturers' websites often have a computer generated 360 degree views of interior and exterior images. Unfortunately, this computer generated 360 degree images also lack genuine realism, resulting in less than desirable results.

As a result of this growing online shopping, there is a push from several different large groups in the automotive industry to use of actual images of motorized transports in a dealer's inventory on the website on the Internet, so a consumer can get a true representation of what they can expect to see if they go to visit the dealer. These groups believe an overwhelming majority of consumers want to see actual images of motorized transports versus stock photos when shopping for new motorized transports online at the dealer's website.

In response to these trends, dealers are beginning to recognize the need for actual images and have begun using their own in-house, used-motorized transport photographers to take pictures of their new motorized transport inventory. These photographers must capture the images of each new motorized transport, manually upload the images to an FTP site, and link them to the dealer stock number. Some of these dealers have even invested significant capital in photo studios to improve upon digital media content quality. Unfortunately, the result is the same because these photographers are not able to keep up with capturing all of the needed images for the constantly changing new motorized transport inventory and the currently available image management software has no effective mechanism for solving this issue. As a result, these dealers often still have and use stock photos on their websites for a large portion of their new motorized transport inventory. Additionally, the media content quality of the images of the actual motorized transport inventory is often of poor and similarly the currently available image management software has no effective mechanism for identifying and solving this issue.

To adjust for these missing actual images, these dealers are considering CGI images as an alternative. This appears to be an attractive option for them because it avoids the cost of transporting actual vehicles for photo shoots and significantly reduces the overhead required, but again results in an inaccurate representation to online shoppers. Additionally, even with this CGI technology the existing image management software is unable to even effectively identify and utilize these CGI images.

SUMMARY

A method for optimizing identification, cross-correlation, building, and utilization of media content of motorized transport inventory includes identifying by an inventory media content management computing device current items of motorized transport inventory from received motorized transport inventory data. Each of the current items of motorized transport inventory has one or more current features. Each match of one or more mapped features of any mapped master pieces of media content with the one or more current features of any of the current items of motorized transport inventory is determined by the inventory media content management computing device. At least one of the master pieces of media content is mapped to two or more of the current items of motorized transport inventory. Any one or more missing pieces of media content of the one or more current features of any of the current items of motorized transport inventory is identified by the inventory media content management computing device based on the one or more determined matched master pieces of media content. One or more of the identified missing pieces of media content of the one or more current features of any of the current items of motorized transport inventory is obtained by the inventory media content management computing device. The one or more identified matched master pieces of media content and the one or more of the obtained missing pieces of media content is provided by the inventory media content management computing device to a requesting sales management computing device associated with the current inventory set of items.

A non-transitory computer readable medium having stored thereon instructions for optimizing identification, cross-correlation, building, and utilization of media content of motorized transport inventory comprising executable code which when executed by a processor, causes the processor to perform steps including identifying current items of motorized transport inventory from received motorized transport inventory data. Each of the current items of motorized transport inventory has one or more current features. Each match of one or more mapped features of any mapped master pieces of media content with the one or more current features of any of the current items of motorized transport inventory is determined. At least one of the master pieces of media content is mapped to two or more of the current items of motorized transport inventory. Any one or more missing pieces of media content of the one or more current features of any of the current items of motorized transport inventory is identified based on the one or more determined matched master pieces of media content. One or more of the identified missing pieces of media content of the one or more current features of any of the current items of motorized transport inventory is obtained. The one or more identified matched master pieces of media content and the one or more of the obtained missing pieces of media content is provided to a requesting sales management computing device associated with the current inventory set of items.

An inventory media content management computing device at least one memory coupled to at least one processor which is configured to be capable of executing programmed instructions comprising and stored in the memory to identify current items of motorized transport inventory from received motorized transport inventory data. Each of the current items of motorized transport inventory has one or more current features. Each match of one or more mapped features of any mapped master pieces of media content with the one or more current features of any of the current items of motorized transport inventory is determined. At least one of the master pieces of media content is mapped to two or more of the current items of motorized transport inventory. Any one or more missing pieces of media content of the one or more current features of any of the current items of motorized transport inventory is identified based on the one or more determined matched master pieces of media content. One or more of the identified missing pieces of media content of the one or more current features of any of the current items of motorized transport inventory is obtained. The one or more identified matched master pieces of media content and the one or more of the obtained missing pieces of media content is provided to a requesting sales management computing device associated with the current inventory set of items.

A method for identification, cross-correlation, building, and utilization a mapped set of pieces of media content of current items of motorized transport inventory includes obtaining by an inventory media content management computing device current items of motorized transport inventory from motorized transport inventory data, each of the current items of motorized transport inventory have one or more current features. One or more of the current pieces of media content of the one or more current features of the current items of motorized transport inventory is obtained by the inventory media content management computing device. Each of the one or more obtained current pieces of media content is mapped by the inventory media content management computing device to one or more of the current features of the current items of motorized transport inventory. Each match of any of the mapped current pieces of media content with any of the current items of motorized transport inventory is determined by the inventory media content management computing device. A display of any of the matched current pieces of media content for one or more selected ones of the current items of motorized transport inventory is provided by the inventory media content management computing device. A selection of the one or more matched current pieces of media content for each of the one or more selected ones of the current items of motorized transport inventory is obtained by the inventory media content management computing device. The selected one or more of the matched current pieces of media content for each of the one or more selected ones of the current items of motorized transport inventory is stored by the inventory media content management computing device.

A non-transitory computer readable medium having stored thereon instructions for identification, cross-correlation, building, and utilization a mapped set of pieces of media content of current items of motorized transport inventory comprising executable code which when executed by a processor, causes the processor to perform steps includes obtaining current items of motorized transport inventory from motorized transport inventory data, each of the current items of motorized transport inventory have one or more current features. One or more of the current pieces of media content of the one or more current features of the current items of motorized transport inventory is obtained. Each of the one or more obtained current pieces of media content is mapped to one or more of the current features of the current items of motorized transport inventory. Each match of any of the mapped current pieces of media content with any of the current items of motorized transport inventory is determined. A display of any of the matched current pieces of media content for one or more selected ones of the current items of motorized transport inventory is provided. A selection of the one or more matched current pieces of media content for each of the one or more selected ones of the current items of motorized transport inventory is obtained. The selected one or more of the matched current pieces of media content for each of the one or more selected ones of the current items of motorized transport inventory is stored.

An inventory media content management computing device at least one memory coupled to at least one processor which is configured to be capable of executing programmed instructions comprising and stored in the memory to obtain current items of motorized transport inventory from motorized transport inventory data, each of the current items of motorized transport inventory have one or more current features. One or more of the current pieces of media content of the one or more current features of the current items of motorized transport inventory is obtained. Each of the one or more obtained current pieces of media content is mapped to one or more of the current features of the current items of motorized transport inventory. Each match of any of the mapped current pieces of media content with any of the current items of motorized transport inventory is determined. A display of any of the matched current pieces of media content for one or more selected ones of the current items of motorized transport inventory is provided. A selection of the one or more matched current pieces of media content for each of the one or more selected ones of the current items of motorized transport inventory is obtained. The selected one or more of the matched current pieces of media content for each of the one or more selected ones of the current items of motorized transport inventory is stored.

This technology provides a number of advantages including providing methods, non-transitory computer readable medium and devices that effectively optimize identification, cross-correlation, building, and utilization of media content of motorized transport inventory. With this technology, items in a particular inventory can be automatically obtained and utilized to identify and retrieve corresponding images. This technology also is able to cross-correlate items of motorized transport inventory and images to identify which images can be reutilized while still providing an accurate real life representation of the item of inventory. Additionally, this technology provides and utilizes unique graphical user interfaces to obtain image content data and media content quality data for qualification of images for subsequent utilization. Further, this technology is able to incorporate branding or other advertising data into the identified and optimized set of images.

BRIEF DESCRIPTION OF THE DRAWINGS

FIG. 9 is a table of an example of the quality of visibility rating data for two features of an item of inventory;

FIG. 10 is a table of an example of processed motorized transport inventory data of a dealer associated with a dealer computing device;

FIG. 11 is a screenshot of an example of different current items of motorized transport inventory which can share mapped images;

FIG. 15 is a diagram of an example of provided output by the inventory media content management computing device;

FIG. 16 is a screenshot of an example of administrative graphical user interface with feature and perspective view fields for selection of which features of an item of inventory are visible from which perspective view of the item of inventory;

FIG. 17 is a screenshot of an example of current items of motorized transport inventory processed into matching groups based on corresponding features;

FIG. 18 is a screenshot of an example of an inventory lookup graphical user interface with inventory identification fields to lookup of a current item of inventory and options to select mapped images based on the perspective view;

FIG. 19 is a screenshot of an example of an image selection graphical user interface which displays available mapped images based on the perspective view for a current item of inventory and fields for selection.

DETAILED DESCRIPTION

Figure 1:
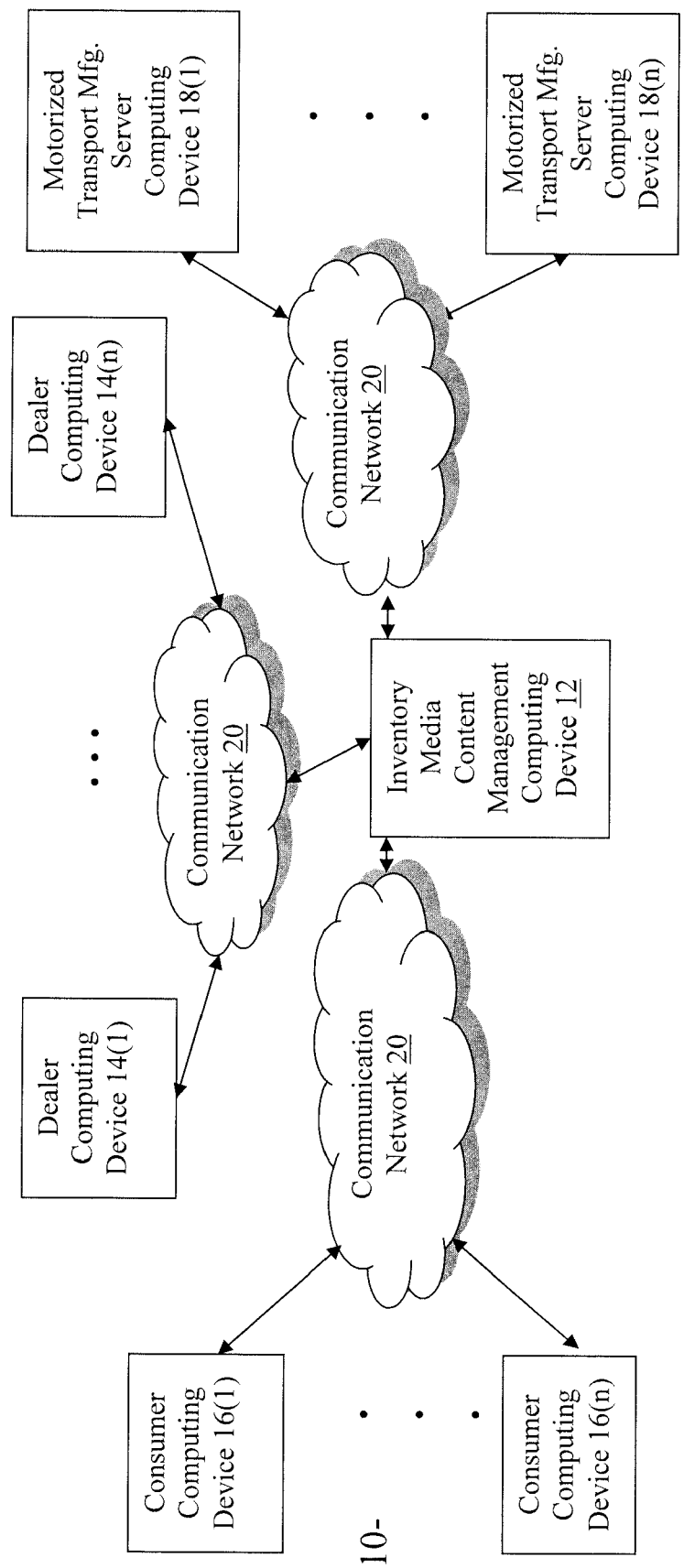
FIG. 1 is a block diagram of an example of an environment with an inventory media content management computing device.
Figure 2:
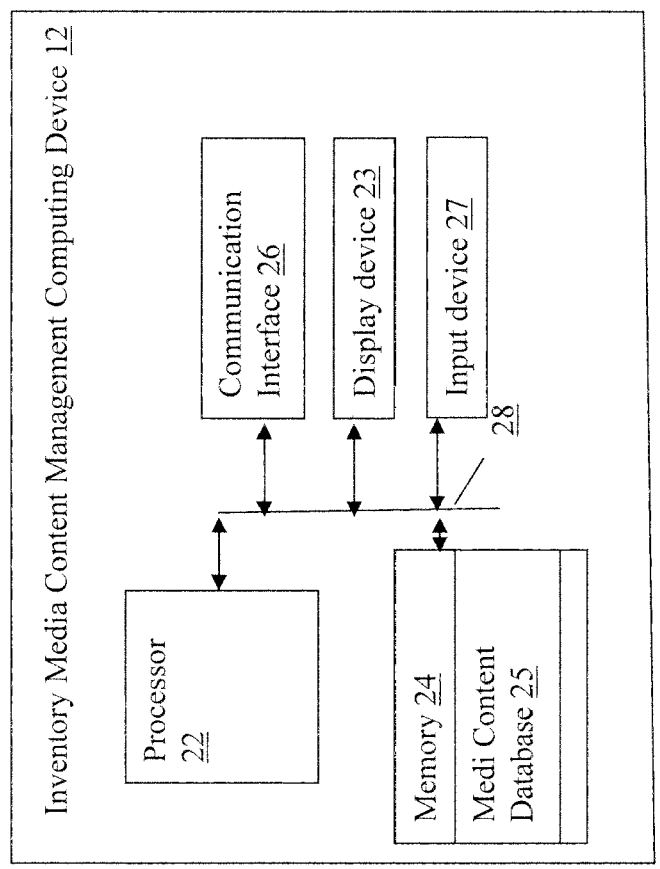
FIG. 2 is a block diagram of an example of the inventory media content management computing device.
Figure 3:
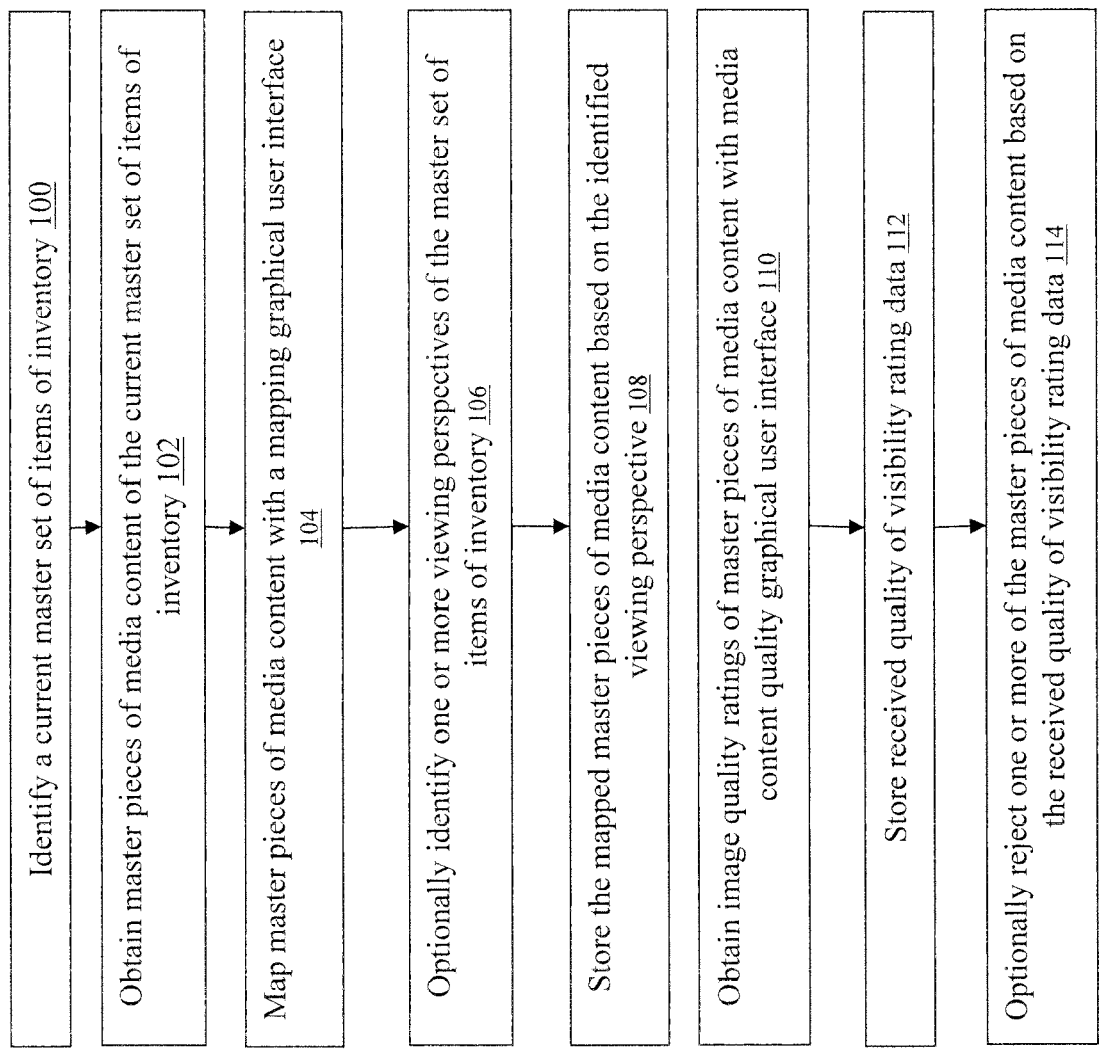
FIG. 3 is a flow chart of an example of a method for processing images for optimizing identification, cross-correlation, building, and utilization of media content of motorized transport inventory.
Figure 4:
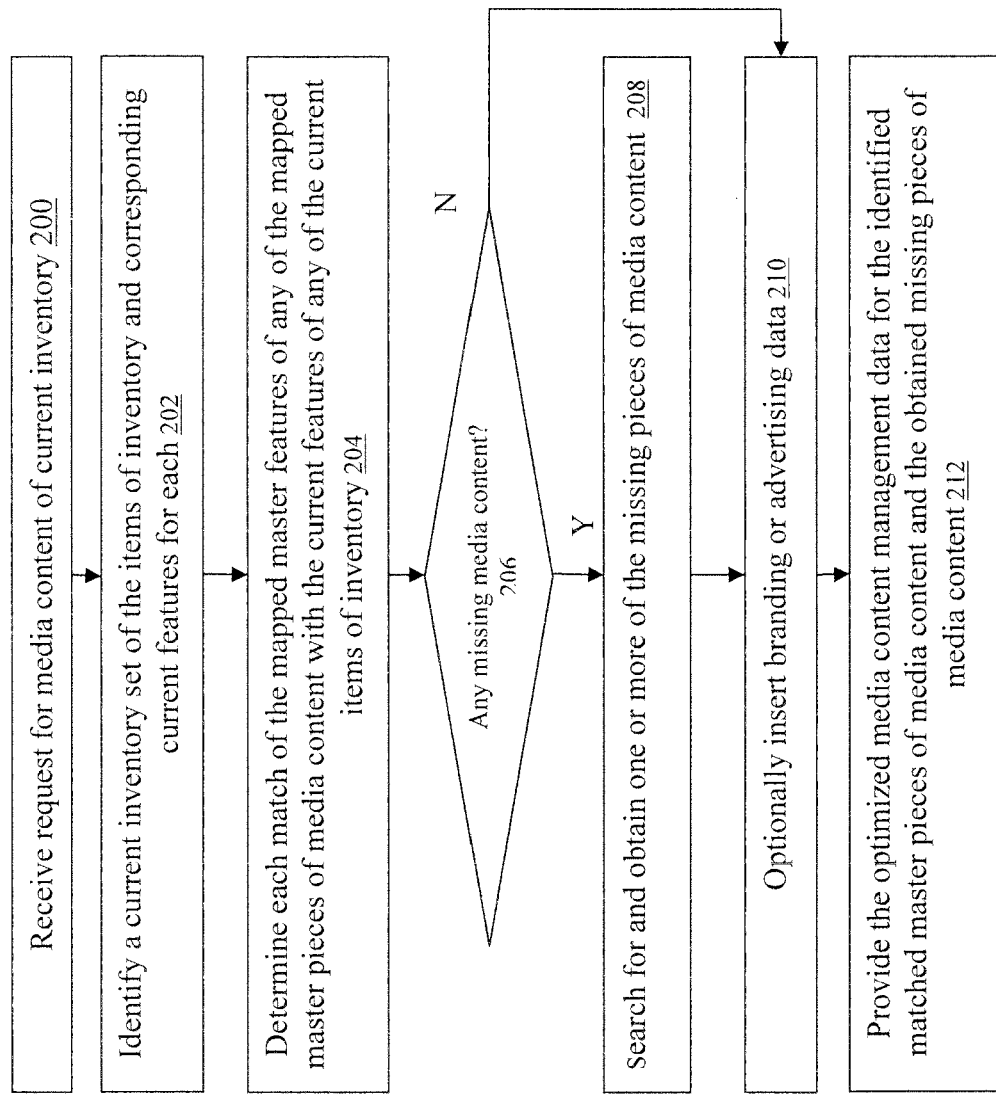
FIG. 4 is a flow chart of an example of a method for optimizing identification, cross-correlation, building, and utilization of processed media content of motorized transport inventory.
Figure 5:
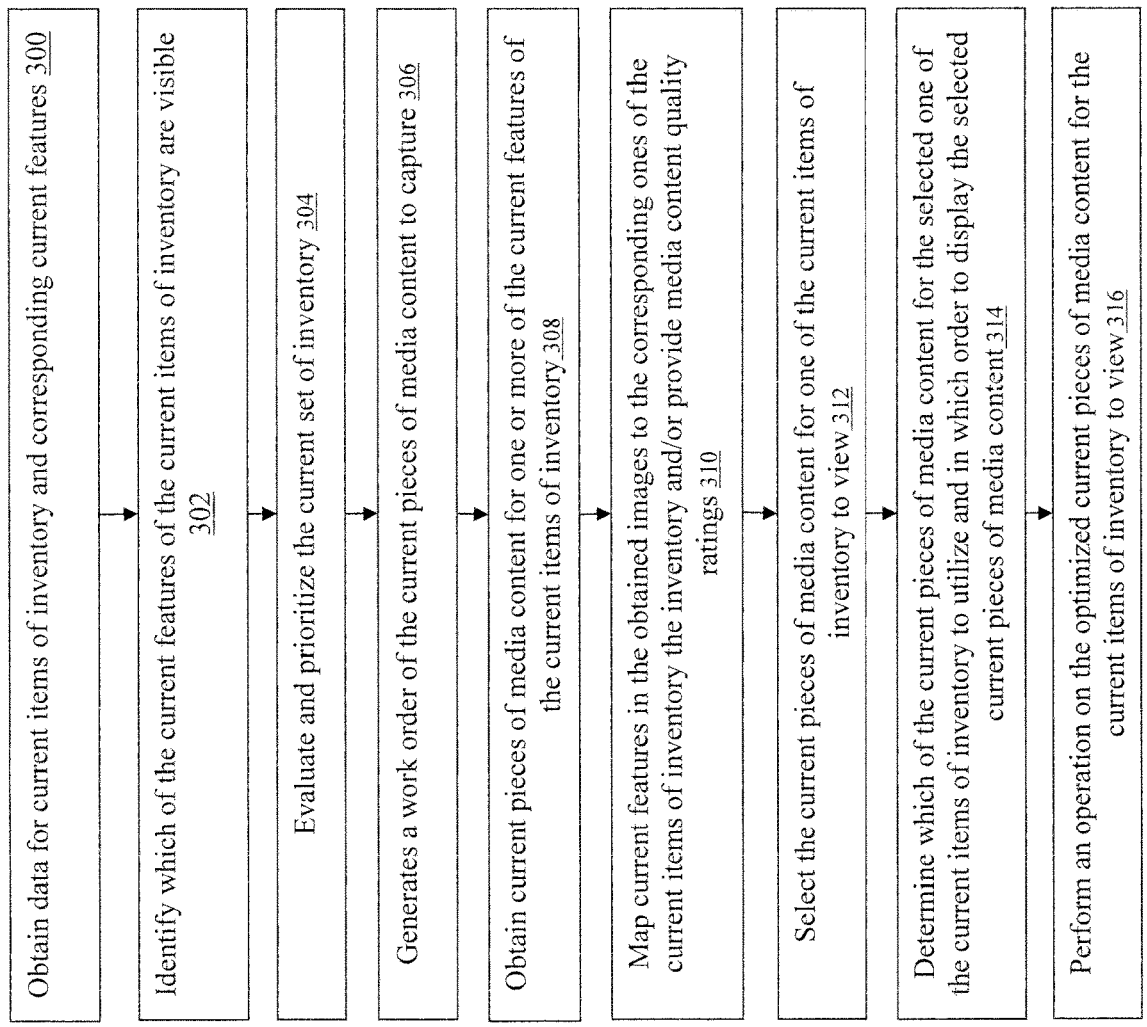
FIG. 5 is a flow chart of an example of a method for identification, cross-correlation, building, and utilization a mapped set of images of current items of motorized transport inventory.

An exemplary network environment 10 with an inventory media content management computing device 12 coupled to dealer computing devices 14(1)-14(n), customer computing devices 16(1)-16(n), and motorized transport manufacturer server devices 18(1)-18(n) by one or more communication networks 20 is illustrated in FIGS. 1 and 2, although this network environment can include other numbers and types of systems, devices, and elements in other configurations. This technology provides a number of advantages including providing methods, non-transitory computer readable media, and devices that effectively optimize identification, cross-correlation, building, and utilization of media content of motorized transport inventory. By way of example only, motorized transport may include one or more of automobiles, motorcycles, trucks, and/or bicycles, although this technology can be used with other types and/or numbers of motorized transport and/or other items of inventory.

Referring more specifically to FIG. 2, the inventory media content management computing device 12 includes a processor 22, a display device 23, a memory 24, an input device 27 and a communication interface 26, which are coupled together by a bus or other link 28, although other numbers and types of systems, devices, components, and elements in other configurations and locations can also be used. The processor 22 in the inventory media content management computing device 12 executes a program of stored instructions for one or more aspects of the present technology, as described and illustrated by way of the examples herein, although other types and/or numbers of processing devices and configurable hardware logic could be used and the processor 22 could execute other numbers and types of programmed instructions.

The memory 24 in the inventory media content management computing device 12 stores these programmed instructions for one or more aspects of the present technology as described and illustrated herein, although some or all of the programmed instructions could be stored and executed elsewhere. A variety of different types of memory storage devices, such as a RAM, ROM, floppy disk, hard disk, CD-ROM, DVD-ROM, or other computer readable medium which is read from and written to by a magnetic, optical, or other reading and writing system that is coupled to the processor 22, can be used for the memory 24. In this particular example, the memory 24 includes a media content database to store a plurality of media content of motorized transport inventory along with any associated data, although other types and/or amounts of data or other information may be stored.

In this particular example, the display device 23 is an LCD screen and the input device 27 comprises a computer mouse and keyboards, although other types and/or numbers of other display devices and/or input devices, such as a touch screen by way of example only, may be used.

The communication interface 26 in the inventory media content management computing device 12 is used to operatively couple and communicate between the inventory media content management computing device 12 and the dealer computing devices 14(1)-14(n), the consumer computing devices 16(1)-16(n), and the motorized transport manufacturer server devices 18(1)-18(n) via one or more of the communication networks 20, although other types and/or numbers of connections and configurations can also be used.

By way of example only, the communication networks 20 can include one or more local area networks or wide area networks, for example, and can use TCP/IP over Ethernet and industry-standard protocols, including hypertext transfer protocol (HTTP) and secure HTTP (HTTPS), although other types and/or numbers of communication networks, such as a direct connection, modems and phone lines, e-mail, and wireless and hardwire communication technology, each having their own communications protocols, can also be used.

In this particular example, the dealer computing devices 14(1)-14(n) each include a processor, a memory, a communication interface, an input device, and a display device, which are coupled together by a bus or other link, although the dealer computing devices 14(1)-14(n) can have other numbers and types of systems, devices, components, and/or elements in other configurations. Additionally, other types and/or numbers of sales management computing devices for managing sales and/or other marketing of items in inventory can be used instead of dealer computing devices 14(1)-14(n). The dealer computing devices 14(1)-14(n) can by way of example only be laptops, desktop computers, servers, mobile computing devices, smartphones, tablets, or any combination thereof. In some examples, dealer computing devices 14(1)-14(n) may interface with the inventory media content management computing device 12 to provide information on motorized transports on the dealer's lot, by way of example only, although other types and/or numbers of functions and/or other operations can be performed.

In this particular example, the customer computing devices 16(1)-16(n) each include a processor, a memory, a communication interface, an input device, and a display device, which are coupled together by a bus or other link, although the customer computing devices can have other numbers and types of systems, devices, components, and/or elements in other configurations. The customer computing devices 16(1)-16(n) can by way of example only be mobile computing devices, smartphones, tablets, laptops, desktop computers, or any combination thereof. The customer computing devices 16(1)-16(n) to interface by the inventory media content management computing device 12 to request actual media content of models of motorized transports on a dealer's lot, by way of example only, although other types and/or numbers of function and other operations on other types of motorized transport inventory or other items of inventory can be performed. In these examples, the media content may comprise one or more images and/or one or more videos, although other types of media content may be used with this technology.

The motorized transport manufacturer server devices 18(1)-18(n) each include a processor, a memory, and a communication interface, which are coupled together by a bus or other link, although each of the motorized transport manufacturer server devices 18(1)-18(n) can have other numbers and types of systems, devices, components, and/or elements in other configurations and locations. Each of the motorized transport manufacturer server devices 18(1)-18(n) can for example be a data storage device configured to store motorized transport inventory data, and/or other types of information, although the server devices could store other types and amounts of information and perform other types and/or numbers of functions or other operations. Additionally, other types of server devices for management of other types of items could be used.

Although examples of the inventory media content management computing device 12, the dealer computing devices 14(1)-14(n), the customer computing devices 16(1)-16(n), and the motorized transport manufacturer server devices 18(1)-18(n), which are coupled together via one or more of the communication networks 20 are described herein, each of these systems can be implemented on any suitable computer system or other computing device and other types and/or numbers of other computing devices or servers could be used. It is to be understood that the devices and systems of the examples described herein are for exemplary purposes, as many variations of the specific hardware and software used to implement the examples are possible, as will be appreciated by those skilled in the relevant art(s). Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. The examples may also be implemented on computer device(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, or combinations thereof.

The examples also may be embodied as a non-transitory computer readable medium having programmed instructions stored thereon for one or more aspects of the present technology as described and illustrated by way of the examples herein. The programmed instructions, when executed by a processor, cause the processor to be capable to carry out the steps necessary to implement one or more methods of the examples, as described and illustrated herein.

An example of a method for optimizing identification, cross-correlation, building, and utilization of motorized transport media content of motorized transport will now be described with reference to FIGS. 1-3 and 6-9, although this example is for illustration purposes only and this technology can be used to manage media content for other types and/or numbers of items of inventory in other manners.

In step 100, to establish or update a master list of motorized transport inventory the inventory media content management computing device 12 may identify a current master set of items of motorized transport inventory, although other manners for identifying a set of inventory can be used. Each of the items of motorized transport inventory in the current master set also has one or more master features or other unique characteristics related to the item of inventory and media content of that item of inventory. In this particular example, the current master set of items of motorized transport inventory relate to models of automobile motorized transports and the master features for these models of motorized transports comprise a year, make, model, trim level, interior color, exterior color, and one or more options of the model of the motorized transport, although other types and/or numbers of items of motorized transport inventory and/or features could be used.

In step 102, the inventory media content management computing device 12 may obtain and/or update master media content of the current master set of items of motorized transport inventory for storage in an imaging database 25 in the memory 24, although other manners of obtaining and/or updating the master media content could be used and the media content could be stored in other locations and manners. By way of example only, the inventory media content management computing device 12 may obtain those master media content from media content sources, such as imaging databases in one or more of the dealer computing devices 14(1)-14(n) which may have captured and stored one or more of the media content of the items of motorized transport inventory and/or the motorized transport manufacturer server devices 18(1)-18(n) which also may have captured and/or stored one or more of the media content of the items of motorized transport inventory. Alternatively, the inventory media content management computing device 12 may identify, generate, and transmit a list of one or more media content of the master set of items of motorized transport inventory to a media content capturing source which can take and transmit back the requested media content to the inventory media content management computing device 12.

Figure 6:
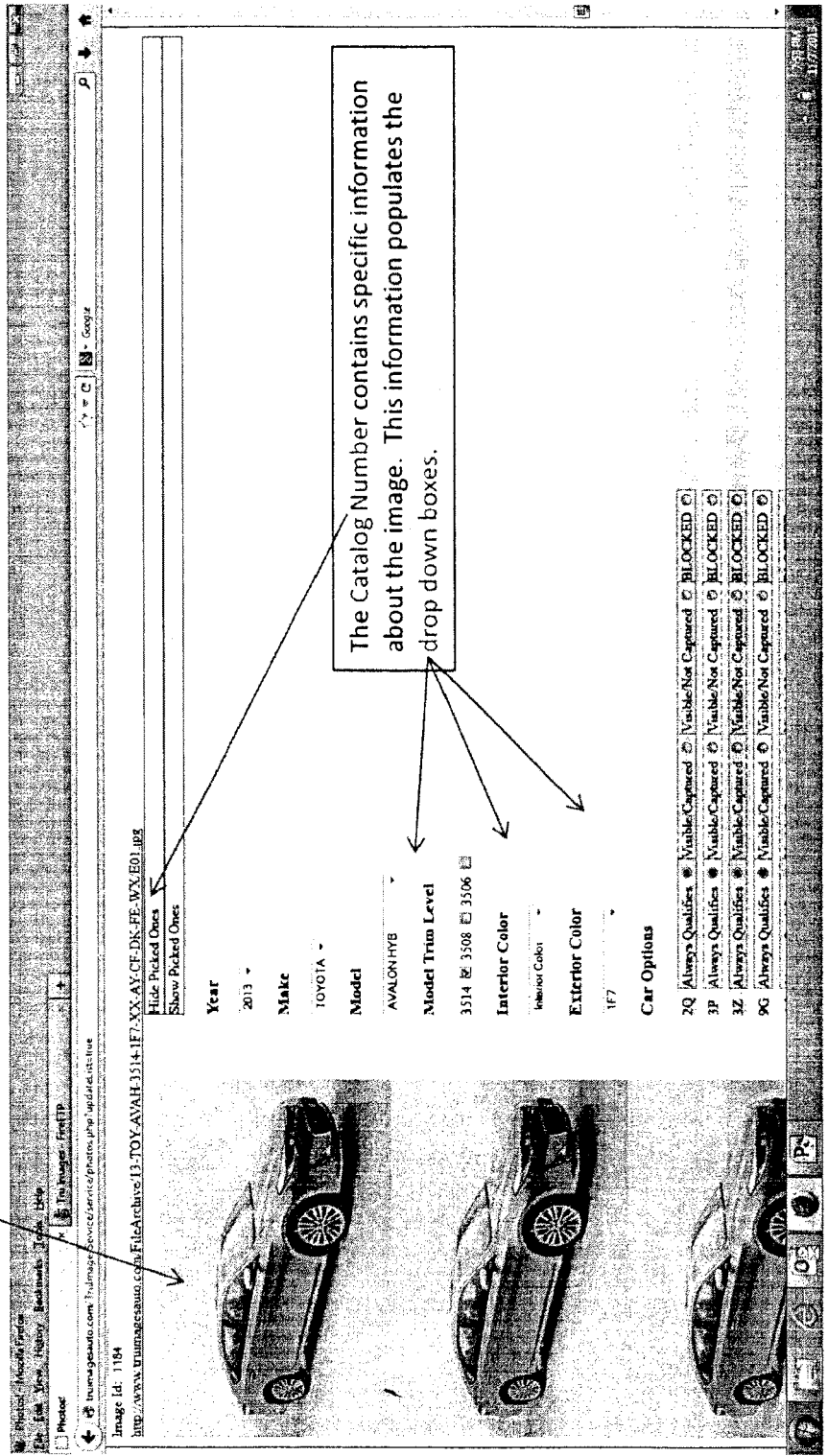
FIG. 6 is a screenshot on an example of a graphical user interface with images and fields to obtain image content data and quality of visibility rating data.
Figure 7:
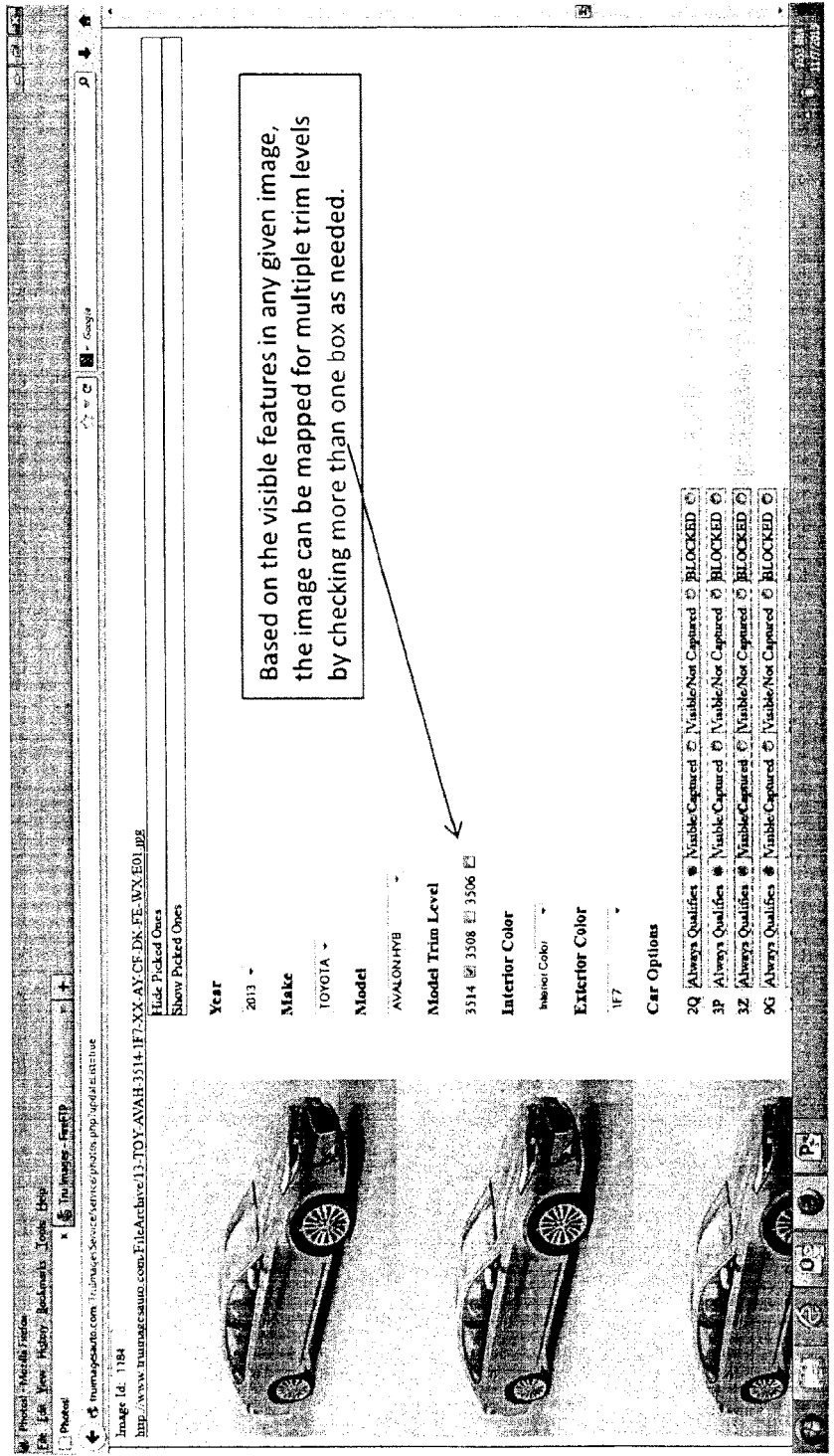
FIG. 7 is a screenshot on another example of a graphical user interface with images and fields to obtain the image content data and quality of visibility rating data.
Figure 8:
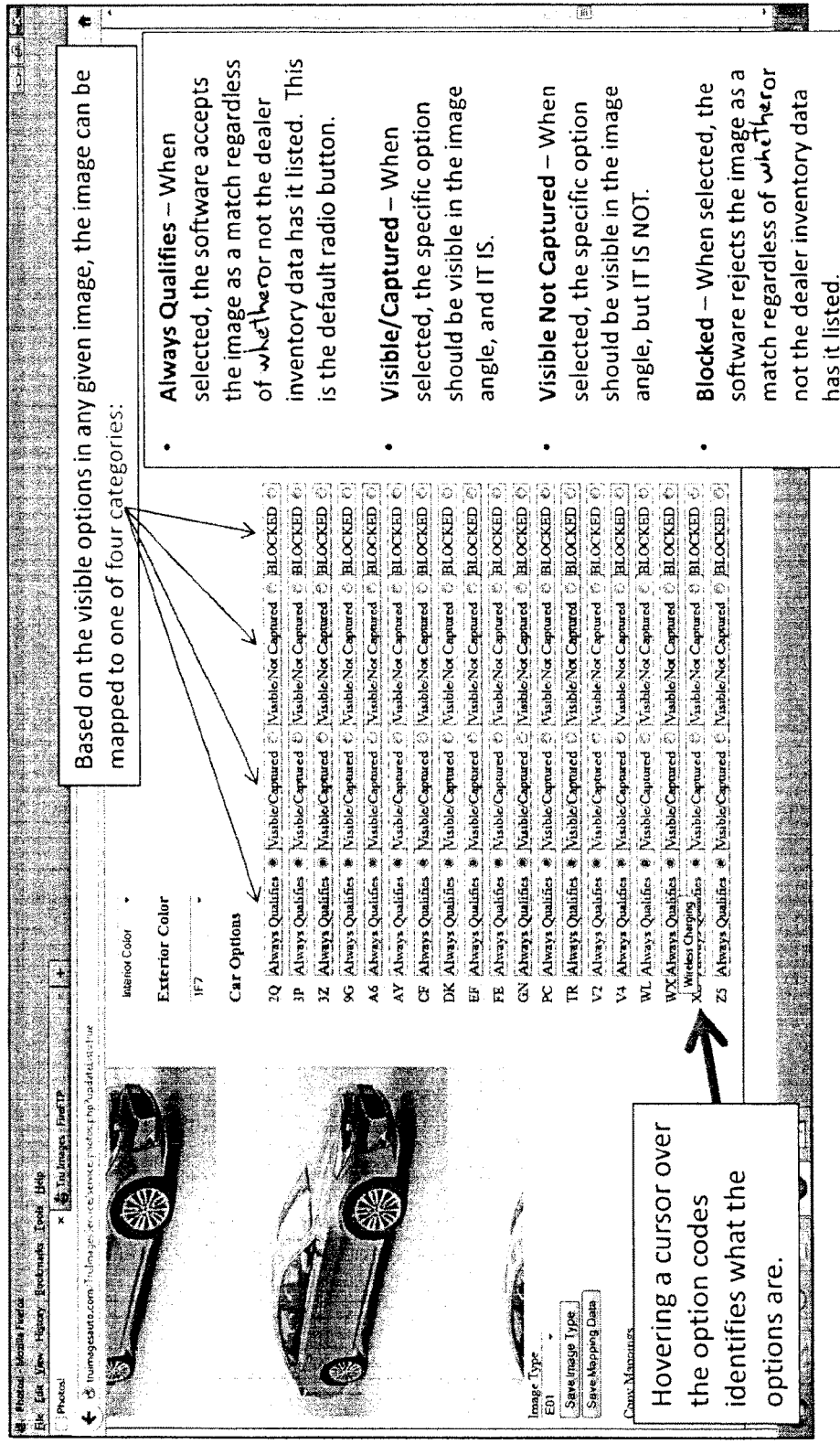
FIG. 8 is a screenshot on another example of a graphical user interface with images and fields to obtain quality of visibility rating data and quality of visibility rating data.

In step 104, the inventory media content management computing device 12 may generate and/or otherwise provide a mapping graphical user interface on display device 23 that displays the master media content along with a plurality of feature input fields for the master features associated with the master set of items of motorized transport inventory for mapping, although the mapping graphical user interface can be provided to other types and/or numbers of computing devices for executing the mapping and other manners for mapping could be used. In this particular example, an operator at the inventory media content management computing device 12 using the input device 27 with the mapping graphical user interface on display device 23 is able to input feature data, for example by a recorded mouse click, to map each of the master media content to one or more of the master features, although again other manners for mapping the master media content may be used. One of the advantages of this technology is that as part of the mapping process, the inventory media content management computing device 12 often may be able to identify at least one master piece of media content that is mapped identically to two or more of the items of motorized transport inventory in the master set which helps the inventory media content management computing device 12 to consolidate the number of pieces of master media content which are required for a master set of inventory. By way of example only, screen shots illustrating examples of this mapping for models of motorized transports in the master set of inventory are illustrated in FIGS. 6-8. In these examples, for each piece of media content the year, make, model, trim level, interior color, exterior color, and options is identified and stored by the inventory media content management computing device 12, although other types and/or numbers of features could be identified and stored.

In step 106, the inventory media content management computing device 12 may optionally identify one or more viewing perspectives of the master set of items of motorized transport inventory. In this particular example for the master set of inventory of models of motorized transports the viewing perspectives comprise interior views and exterior views, although other types and/or numbers of viewing perspectives can be established or used.

In step 108, the inventory media content management computing device 12 may store the mapped master media content based on the identified viewing perspective in the media content database 25 in memory 24, although the mapped master media content may be stored in other locations and/or manners. When the inventory media content management computing device 12 identifies viewing perspectives, then the inventory management computing device may also analyze and adjust the mapping to identify the particular one or more master features which are only visible from the interior and the one or more master features which are only visible from the exterior. By way of example, one or more of the car options may only be visible from the interior so that mapped master media content for an interior of a model of a motorized transport may match the interior of two or more models of motorized transports which have different exteriors. This enables the inventory media content management computing device 12 to consolidate the number of pieces of master media content which may be needed to accurately represent an interior of multiple models of motorized transports.

In step 110, the inventory media content management computing device 12 may optionally generate and/or or otherwise provide on display device 23 an media content quality graphical user interface displaying at least one of the master media content and a quality of visibility rating input field for each mapped feature in the at least one of the master media content for managing media content quality, although the media content quality graphical user interface can be provided to other types and/or numbers of computing devices for executing the media content quality review and other manners for conducting media content quality review could be used. In this particular example, the quality of visibility rating data with respect to each of the master features comprises: always qualifies; visible/captured; visible not captured; or blocked, although other types and/or numbers of quality ratings could be used. In this particular example, an operator at the inventory media content management computing device 12 using the input device 27 with the media content quality graphical user interface on display device 23 is able to input media content quality data, for example by a recorded mouse click, to provide an media content quality rating for each of the master features in each of the master media content, although again other manners for providing media content quality assessments of the master media content may be used. One of the advantages of this technology is that as part of the media content quality assessment, the inventory media content management computing device 12 is able to further identify the highest quality master piece of media content for a master item of motorized transport inventory with a particular set of master features, even if the highest quality piece of media content is actually of another master item of motorized transport inventory with the same set of master features. By way of example only, if the same model of motorized transport is in inventory with two different exterior views, such as different color and trim, but the same interior view, such as the same interior color for leather and same master features, then the inventory media content management computing device 12 could use the better quality master piece of media content of the interior of one of the models of motorized transport for both motorized transports. By way of example only, screen shots illustrating examples of this assessment of media content quality of master media content for models of motorized transports in the master set of inventory are illustrated in FIGS. 6-9.

In step 112, the inventory media content management computing device 12 may store received quality of visibility rating data input in the quality of visibility rating fields for the master media content in the media content database 25 in memory 24, although the received quality of visibility rating data may be stored in other locations and/or in other manners.

In step 114, the inventory media content management computing device 12 may optionally reject one or more of the master media content based on the received quality of visibility rating data, although the inventory media content management computing device 12 may utilize the obtained media content quality data in other manners.

An example of a method for optimizing identification, cross-correlation, building, and utilization of processed media content of motorized transport inventory will now be described with reference to FIGS. 1-2, 4, and 10-15, although this example is for illustration purposes only and this technology can be used to manage media content for other types and/or numbers of items of inventory in other manners.

In step 200, the inventory media content management computing device 12 may optionally receive a request for media content from one of the dealer computing devices 14(1)-14(n) associated with an automobile dealership with a current inventory of motorized transports from one or more motorized transport manufacturers, although other manners for initiating this method to obtain a subset of the mapped master media content for a current set of inventory could be used.

In step 202, the inventory media content management computing device 12 may identify a current inventory set of the items of motorized transport inventory and corresponding current features from the received motorized transport inventory data from one of the dealer computing devices 14(1)-14(n), although the motorized transport inventory data can be obtained from other sources and/or in other manners. In this particular example, the inventory media content management computing device 12 requests, receives, and processes dealer motorized transport inventory data from the requesting one of the dealer computing devices 14(1)-14(n), although again other manners for obtaining the motorized transport inventory data on the current items of motorized transport inventory and/or current features can be used. By way of example only, a screenshot of provided current dealer motorized transport inventory which identifies the items of motorized transport inventory by year, make, model and motorized transport identification number (VIN) and the features by trim level, options, exterior color and interior color is illustrated in FIG. 10, although other manners for identifying and other types and/or numbers of items of motorized transport inventory and/or features could be used. Additionally, a screenshot of an example of the same models of a current motorized transport, but with different features is illustrated in FIG. 11. In this particular example, as illustrated and described herein this technology is able to identify and in some examples utilize the same mapped media content for the same models of a current motorized transport which have different features which helps to consolidate the necessary media content database while still providing realistic pieces of media content of the interior and exterior of each of the models of motorized transport.

Figure 12:
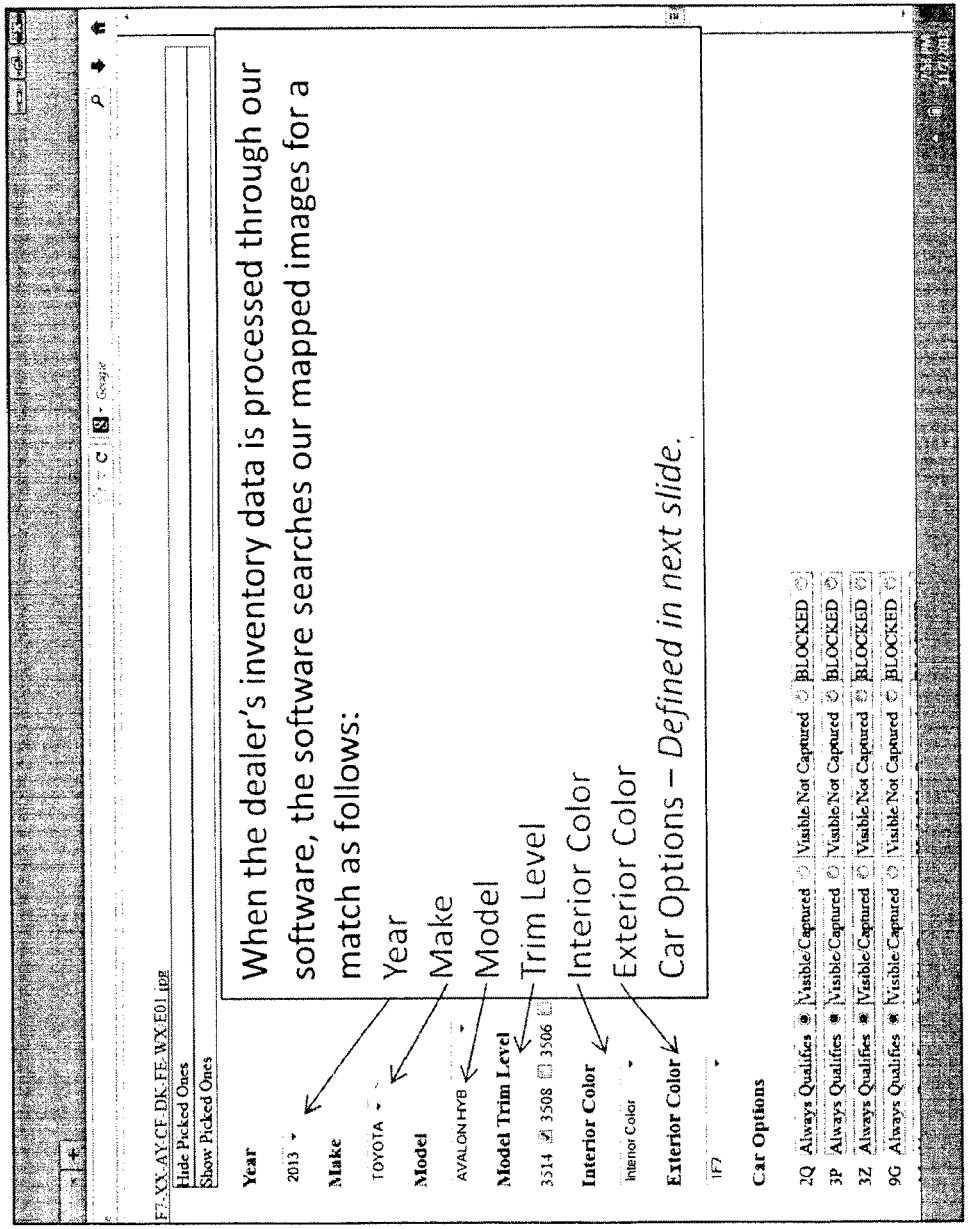
FIG. 12 is a screenshot of an example of a match processing graphical user interface with fields for input data about to identify and obtain qualified mapped master pieces of media content.

In step 204, the inventory media content management computing device 12 determines each match of the one or more mapped master features of any of the mapped master media content with the one or more current features of any of the current items of motorized transport inventory, although other manners for identifying a subset of the mapped master media content may be used. In this particular example, the inventory media content management computing device 12 may generate and/or otherwise provide a match processing graphical user interface on display device 23 that displays current items of motorized transport inventory fields and current feature input fields for correlating to mapped master media content to the current items of motorized transport inventory, although the match processing graphical user interface can be provided to other types and/or numbers of computing devices for executing the match processing could be used. In this particular example, an operator at the inventory media content management computing device 12 using the input device 27 with the match processing graphical user interface on display device 23 is able to input current feature data, for example by a recorded mouse click, to map each of the mapped pieces of master media content to one or more of the current items of motorized transport inventory with corresponding current features, although again other manners for identifying a subset of the pieces of master media content for the current items of motorized transport inventory may be used. One of the advantages of this technology is that as part of the matching process, the inventory media content management computing device 12 often may be able to identify at least one master piece of media content that is mapped to two or more of the current items of motorized transport inventory which helps the inventory media content management computing device 12 to consolidate the number of mapped master media content which are required for the current set of items of motorized transport inventory. An example of the match processing graphical user interface is illustrated in FIG. 12. In this particular example, the inventory media content management computing device 12 identifies matches based on a match between one or more of a motorized transport year, make, model trim level, interior color, exterior color, and/or options using the assigned visibility ratings, although other types and/or numbers of other features or characteristics could be used.

In step 206, the inventory media content management computing device 12 determines if any of the one or more current features of any of the current items of motorized transport inventory are missing from the matched master media content. If in step 206, the inventory media content management computing device 12 determines none of the one or more current features of any of the current items of motorized transport inventory are missing from the matched master media content, then the No branch is taken to step 210. If in step 206, the inventory media content management computing device 12 determines at least one of the one or more current features of any of the current items of motorized transport inventory is missing from the matched master media content, then the Yes branch is taken to step 208.

Figure 13:
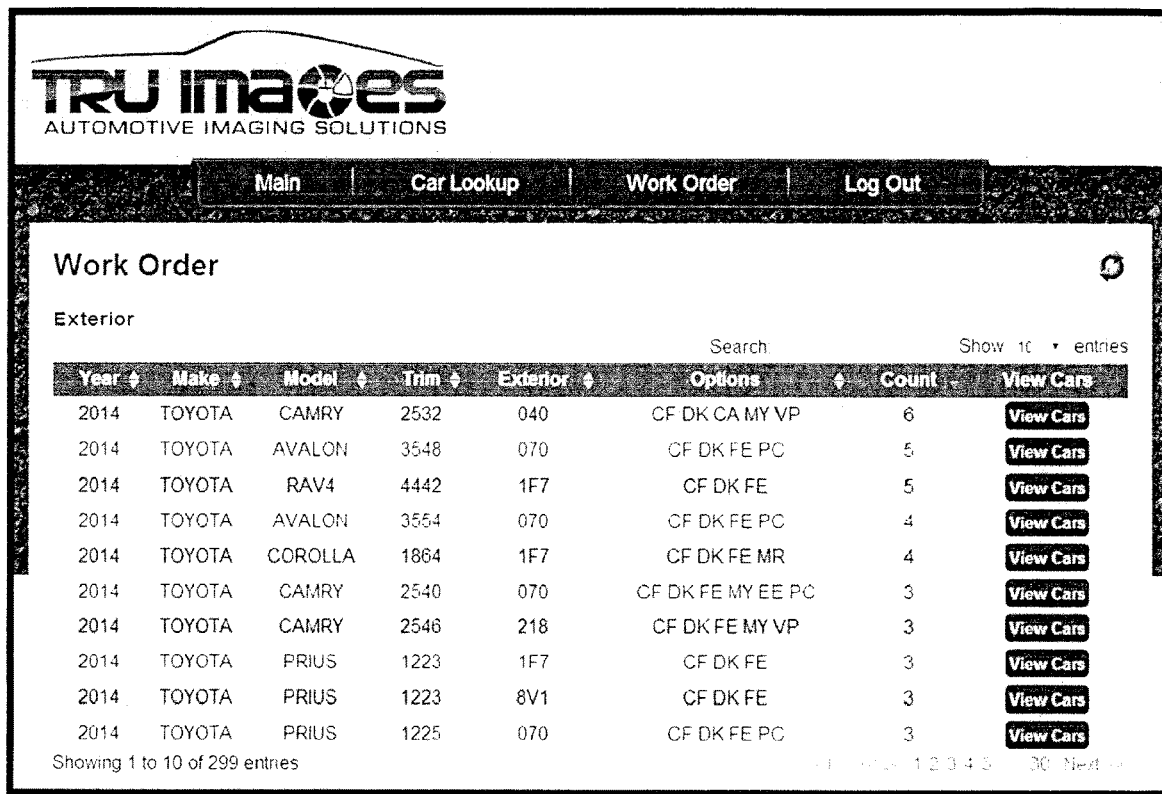
FIG. 13 is a screenshot of an example of a generated work order to obtain missing media content.

In step 208, the inventory media content management computing device 12 may search for and obtain one or more of the missing media content from imaging databases in one or more of the dealer computing devices 14(1)-14(n) and/or from one or more of the motorized transport manufacturer server computing devices 18(1)-18(n) by way of example only, although other manners of obtaining the missing media content and also updating the stored master media content with these missing media content could be used. The inventory media content management computing device 12 may also update the stored master media content with these missing media content could be used. In an alternative example, the inventory media content management computing device 12 may generate, and transmit a list of one or more missing media content to a media content capture source, such as one of the dealer computing devices 14(1)-14(n) which may be assigned to a photographer or to an external media content capturing computing device (not shown) associated with a designated photographer, to capture and transmit back the requested missing media content to the inventory media content management computing device 12. By way of example only, a screenshot of an example of a work order to obtain missing media content for exterior views of motorized transports generated by the inventory media content management computing device 12 and transmitted to a media content capture source is illustrated in FIG. 13. In another alternative example, the inventory media content management computing device 12 may alternatively use computer generated software to produce computer generated media content to obtain the one or more of the identified missing media content.

Figure 14:
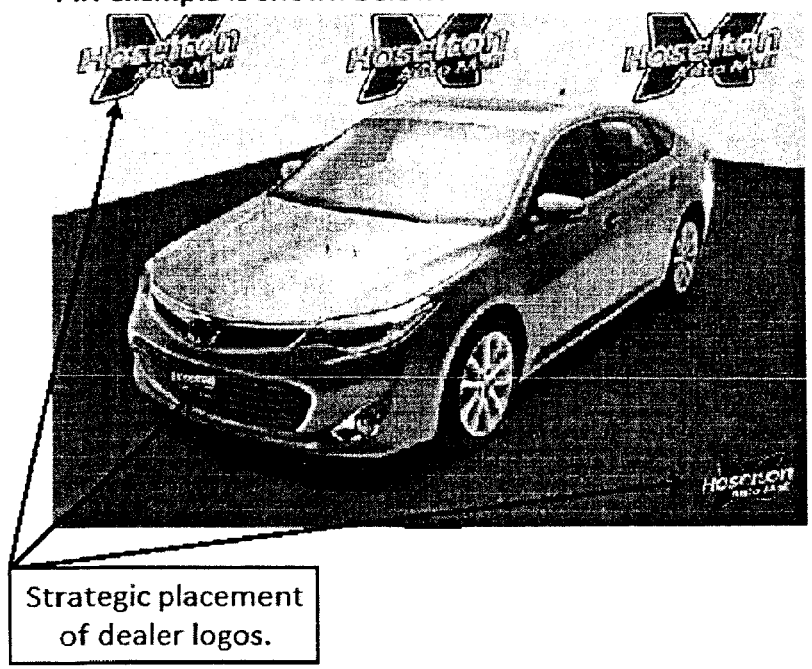
FIG. 14 is a screenshot of an example of adding branding or other advertising data into a mapped master image.

In step 210, the inventory media content management computing device 12 may optionally insert branding or advertising data into one or more of the identified matched master media content and/or the one or more of the obtained missing media content. By way of example only, the inventory media content management computing device 12 may apply branding to one or more locations of one or more of the pieces of media content of the motorized transport as illustrated in FIG. 14. In this particular example, this branding or other advertising data accentuates realism and markets the dealership associated with one of the dealer computing devices 14(1)-14(n) through the strategic placement of logos. By way of example only, the added branding or other advertising data may be added as follows: (1) Gray studio floor to accentuate realism; (2) Dealer logo on ALL license plates; (3) Dealer Logo along back wall of studio; and (4) Dealer logo on lower right corner of all pieces of media content, although other locations and/or types of branding or other advertising can be used.

In step 212, the optimized imaging management data for the one or more identified matched pieces of master media content and/or the one or more of the obtained pieces of missing media content with any optional inserted branding or other advertising data generated by the inventory media content management computing device 12 is packaged and provided to a requesting sales management computing device associated with the current inventory set of items. By way of example only, the optimized imaging management data provided by inventory media content management computing device 12 illustrated in FIG. 15.

An example of a method for identification, cross-correlation, building, and utilization a mapped set of media content of current items of motorized transport inventory will now be described with reference to FIGS. 1-2 and 5-20, although this example is for illustration purposes only and this technology can be used to manage media content for other types and/or numbers of items of inventory in other manners.

In step 300, the inventory media content management computing device 12 obtains the data for current items of motorized transport inventory and corresponding current features from received or otherwise retrieved motorized transport inventory data, although the motorized transport inventory data can be obtained from other sources and/or in other manners. By way of example only, a screenshot of obtained current dealer motorized transport inventory which identifies the items of motorized transport inventory by year, make, model and motorized transport identification number (VIN) and the features by trim level, options, exterior color and interior color is illustrated in FIG. 10, although other manners for identifying and other types and/or numbers of items of motorized transport inventory and/or features could be used. Additionally, a screenshot of an example of current items of motorized transport inventory comprising the same models of a current motorized transport, but with different current features is illustrated in FIG. 11. In this particular example, as illustrated and described herein this technology is able to identify and in some examples utilize the same mapped pieces of media content for the same models of a current motorized transport which have different current features which helps to consolidate the necessary media content database while still providing realistic pieces of media content of the interior and exterior of each of the models of motorized transports.

In step 302, the inventory media content management computing device 12 may identify which of the current features of the current items of motorized transport inventory are visible and may also determine which are visible based on a particular perspective view, although other manners for evaluating and determining whether a reduced set of current features for the current items of motorized transport inventory could be used. In this particular example, the inventory media content management computing device 12 may display an administrative graphical user interface with current features identified from the obtained current motorized transport inventory data and separated based on their visibility from different perspective view fields for selection as illustrated in FIG. 16, although other manners for selecting which current features for one or more different perspective views could be used.

In step 304, the inventory media content management computing device 12 may evaluate and prioritize the current set of inventory based on one or more characteristics, such as based on subtotals of current items of motorized transport inventory with the same visible current features. By way of example only, a screenshot of an example of current items of motorized transport inventory prioritized based on subtotals of current items of motorized transport inventory with the same visible current features is shown in FIG. 17. In another example, if the current items of motorized transport inventory comprise Toyota Camrys and there are four black XLE Camrys in stock with the same current features, e.g. options, and two silver XLE Camrys in stock with the same current features, then the inventory media content management computing device 12 could prioritize obtaining current media content of the current item in inventory with the greatest quantity, e.g. the four black XLE Camrys, although other manners for determining priority could be used, such as selecting the items of motorized transport inventory which are currently the fastest selling items.

In step 306, the inventory media content management computing device 12 generates a work order of the current media content to capture of the one or more current features of one or more of the current items of motorized transport inventory. By way of example only, a screenshot of an example of a work order to obtain missing media content for exterior views of motorized transports generated by the inventory media content management computing device 12 and transmitted to a media content capture source is illustrated in FIG. 13. In one example, the inventory media content management computing device 12 may be able to generate reduced work order of the current media content to capture of the one or more current features of one or more of the current items of motorized transport inventory by identifying which of the current media content might be utilized by two or more of the same type of item of inventory.

In step 308, the inventory media content management computing device 12 obtains current media content for one or more of the current features of the current items of motorized transport inventory, although other manners for obtaining the media content could be used. For example, the inventory media content management computing device 12 may further obtain the current media content for one or more of the current features of the current items of motorized transport inventory based on a particular view, such as an exterior view of a model of a motorized transport and an interior view of a model of a motorized transport. In another alternative example, the inventory media content management computing device 12 may alternatively use computer generated software to produce computer generated media content to obtain the one or more of the current pieces of media content.

In step 310, the inventory media content management computing device 12 can map current features in the obtained pieces of media content to the corresponding ones of the current items of motorized transport inventory and/or provide media content quality ratings. By way of example only, the inventory media content management computing device 12 may generate and/or otherwise provide a mapping graphical user interface on a display device that displays the current media content along with a plurality of feature input fields for the current features associated with the current set of items of motorized transport inventory for mapping, although the mapping graphical user interface can be provided to other types and/or numbers of computing devices for executing the mapping and other manners for mapping could be used. In this particular example, an operator at the inventory media content management computing device 12 using the input device with the mapping graphical user interface on display device is able to input feature data, for example by a recorded mouse click, to map each of the pieces of current media content to one or more of the current features, although again other manners for mapping the current media content may be used. One of the advantages of this technology is that as part of the mapping process, the inventory media content management computing device 12 often may be able to identify at least one current piece of media content that is mapped identically to two or more of the items of motorized transport inventory in the current items of motorized transport inventory which helps the inventory media content management computing device 12 to consolidate the number of pieces of current media content which are required for a master set of inventory. By way of example only, screen shots illustrating examples of this mapping for models of motorized transports in the master set of inventory are illustrated in FIGS. 6-8. In these examples, for each piece of media content the year, make, model, trim level, interior color, exterior color, and options is identified and stored by the inventory media content management computing device 12, although other types and/or numbers of features could be identified and stored.

Additionally, the inventory media content management computing device 12 may optionally generate and/or or otherwise provide on display device an media content quality graphical user interface displaying at least one of the current media content and a quality of visibility rating input field for each mapped current feature in the at least one of the pieces of current media content for managing media content quality, although the media content quality graphical user interface can be provided to other types and/or numbers of computing devices for executing the media content quality review and other manners for conducting media content quality review could be used. In this particular example, the quality of visibility rating data with respect to each of the current features comprises: always qualifies; visible/captured; visible not captured; or blocked, although other types and/or numbers of quality ratings could be used. In this particular example, an operator at the inventory media content management computing device 12 using an input device with the media content quality graphical user interface on a display device is able to input media content quality data, for example by a recorded mouse click, to provide an media content quality rating for each of the master features in each of the master media content, although again other manners for providing media content quality assessments of the master media content may be used. One of the advantages of this technology is that as part of the media content quality assessment, the one of the dealer computing devices 14(1)-14(n) is able to further identify the highest quality master piece of media content for a master item of motorized transport inventory with a particular set of master features, even if the highest quality piece of media content is actually of another master item of motorized transport inventory with the same set of master features. By way of example only, if the same model of motorized transport is in inventory with two different exterior views, such as different color and trim, but the same interior view, such as the same interior color for leather and same master features, then the inventory media content management computing device 12 could use the better quality master piece of media content of the interior of one of the models of motorized transport for both motorized transports. By way of example only, screen shots illustrating examples of this assessment of media content quality of current media content for models of motorized transports in the current set of inventory are illustrated in FIGS. 6-9

Figure 18:
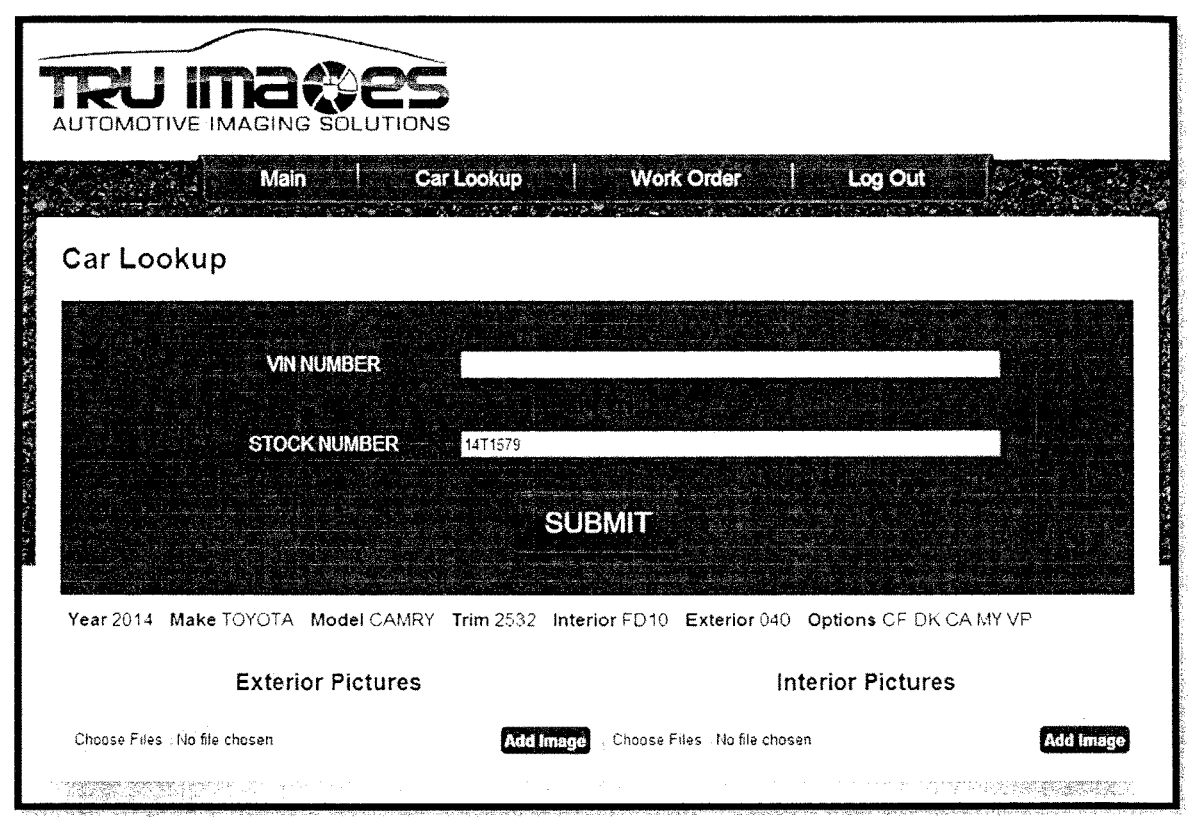

In step 312, the inventory media content management computing device 12, may select the current media content for one of the current items of motorized transport inventory to view, although other manners for optimizing the current media content could be used. Additionally, the inventory media content management computing device 12, may select the current media content for one of the current items of motorized transport inventory to view based on the particular view, such as an exterior view of interior view by way of example only. By way of example only, a screenshot of an example of an inventory lookup graphical user interface for the inventory media content management computing device 12 with inventory identification fields to lookup of a current item of inventory and options to select current media content based on the perspective view is illustrated in FIG. 18

Figure 20:
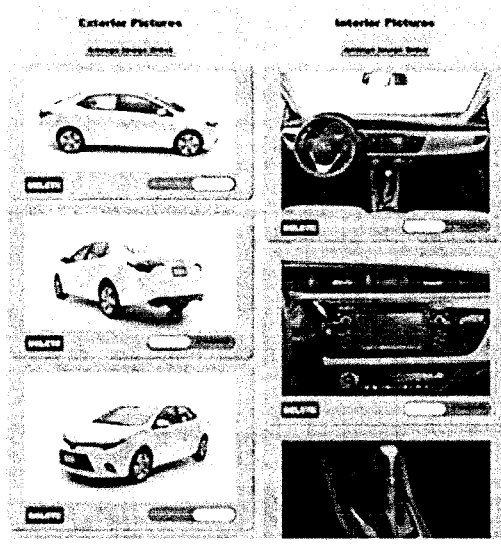
FIG. 20 is a screenshot of an example of an example of an image selection graphical user interface which displays available mapped images for particular features and fields for their selection for a current item of inventory.

In step 314, the inventory media content management computing device 12 may determine which of the current media content for the selected one of the current items of motorized transport inventory to utilize and in which order to display the selected current media content, although other manners for optimizing the set of current media content associated with each current item of inventory could be used. Additionally, the inventory media content management computing device 12, may determine which of the current media content for the selected one of the current items of motorized transport inventory to utilize and in which order to display the selected current media content based on the particular view, such as an exterior view of interior view by way of example only. By way of example only, a screenshot of an example of a media content selection graphical user interface for the inventory media content management computing device 12 which displays available pieces of current media content based on the perspective view for a current item of inventory and for determination of which to display and/or in which order is illustrated in FIG. 19. Another example, of a screenshot of an example of a media content selection graphical user interface for the inventory media content management computing device 12 which displays current media content for a particular current feature for determination of which to display and/or in which order is illustrated in FIG. 20.

In step 316, the determined set of one or more current media content for one or more of the current items of motorized transport inventory based on the particular view is stored by the inventory media content management computing device 12, although the determined sets can be utilized in other manners. Additionally, a variety of ongoing operations could be performed with respect to this stored set of optimized pieces of current media content for the current items of inventory. For example, the inventory media content management computing device 12 could monitor for any changes or updates in the current items of inventory and could quickly process and update the stored set of optimized pieces of current media content for the current items of inventory based on any changes. Additionally, by way of example the inventory media content management computing device 12 may also correlate which different stored sets of optimized pieces of current media content for different current items of inventory might be able to be shared in building or updating other stored sets. Further, by way of example in response to a request which identifies a particular one of the current items of motorized transport inventory and may identify a particular view, the inventory media content management computing device 12 will retrieve and provide for display the corresponding current pieces of stored media content. Other types and/or numbers of other operations may also be performed on these stored sets of media content.

With this technology, as more items of motorized transport inventory are added to the media content database the need to obtain some new pieces of media content may be eliminated. Additionally, one or more of the dealer computing devices 14(1)-14(n) may be able to share the stored sets of current media content to further build individual media content databases which helps to further speed up this process for the end user by way of example only.

Accordingly, as illustrated and described by way of references to the examples herein, this technology provides methods, non-transitory computer readable medium and devices that effectively optimize identification, cross-correlation, building, and utilization of media content of motorized transport inventory. With this technology, items in a particular inventory can be automatically obtained and utilized to identify and retrieve corresponding pieces of media content. This technology also is able to cross-correlate items of motorized transport inventory and pieces of media content to identify which pieces of media content can be reutilized while still providing an accurate real life representation of the item of inventory. Additionally, this technology provides and utilizes unique graphical user interfaces to obtain media content and media content quality data for qualification of pieces of media content for subsequent utilization. Further, this technology is able to incorporate branding or other advertising data into the identified and optimized set of media content.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

mapping, by a computing device, of any one or more stored pieces of media content data in an inventory database to identifier data for a current item of transport inventory based on a specific criteria, wherein the specific criteria comprises a match in any of a set of viewing perspectives for the identified current item of transport inventory between one or more of the stored pieces of image media content data and the identifier data for the current item of transport;

determining, by the computing device, any one or more missing pieces of media content data for the set of viewing perspectives for the identified current item of transport inventory based on the mapping;

receiving, by the computing device, an electronic upload to the inventory database of any of the determined one or more missing pieces of media content data with the association to the identifier data; and providing, by the computing device, any of the one or more mapped stored media content data and any of the received one or more pieces of missing pieces of media content data to a dealer computing device.

2. The method of claim 1 further comprises identifying, by the computing device, the current item of transport inventory based on an obtained electronically transmitted entry of the identifier data.

3. The method of claim 1 further comprising enabling, by the computing device, additional media content to be electronically edited into at least one of the stored media content data with the association to the identifier data.

4. A non-transitory computer readable medium having stored thereon instructions comprising executable code which when executed by a processor, causes the processor to:

map of any one or more stored pieces of media content data in an inventory database to identifier data for a current item of transport inventory based on a specific criteria, wherein the specific criteria comprises a match in any of a set of viewing perspectives for the identified current item of transport inventory between one or more of the stored pieces of image media content data and the identifier data for the current item of transport;

determine any one or more missing pieces of media content data for the set of viewing perspectives for the identified current item of transport inventory based on the map;

receive an electronic upload to the inventory database of any of the determined one or more missing pieces of media content data with the association to the identifier data; and provide any of the one or more mapped stored media content data and any of the received one or more pieces of missing pieces of media content data to a dealer computing device.

5. The medium of claim 4 wherein the instructions further comprise executable code which when executed by a processor, causes the processor to:

identify the current item of transport inventory based on an obtained electronically transmitted entry of the identifier data.

6. The medium of claim 4 wherein the instructions further comprise executable code which when executed by a processor, causes the processor to:
  enable additional media content to be electronically edited into at least one of the stored media content data with the association to the identifier data.

7. A computing device, comprising:
a processor; and
a memory coupled to the processor which is configured to be capable of executing programmed instructions stored in the memory to:
  map of any one or more stored pieces of media content data in an inventory database to identifier data for a current item of transport inventory based on a specific criteria, wherein the specific criteria comprises a match in any of a set of viewing perspectives for the identified current item of transport inventory between one or more of the stored pieces of image media content data and the identifier data for the current item of transport;
  determine any one or more missing pieces of media content data for the set of viewing perspectives for the identified current item of transport inventory based on the map;
  receive an electronic upload to the inventory database of any of the determined one or more missing pieces of media content data with the association to the identifier data; and
  provide any of the one or more mapped stored media content data and any of the received one or more pieces of missing pieces of media content data to a dealer computing device.

8. The device of claim 7 wherein the processor coupled to the memory is further configured to be capable of executing at least one additional programmed instruction stored in the memory to:
  identify the current item of transport inventory based on an obtained electronically transmitted entry of the identifier data.

9. The device of claim 7 wherein the processor coupled to the memory is further configured to be capable of executing at least one additional programmed instruction stored in the memory to:
  enable additional media content to be electronically edited into at least one of the stored media content data with the association to the identifier data.

* * * * *